E. G. MATTHEWS.
Seed-Drills.
No. 139,074. Patented May 20, 1873.
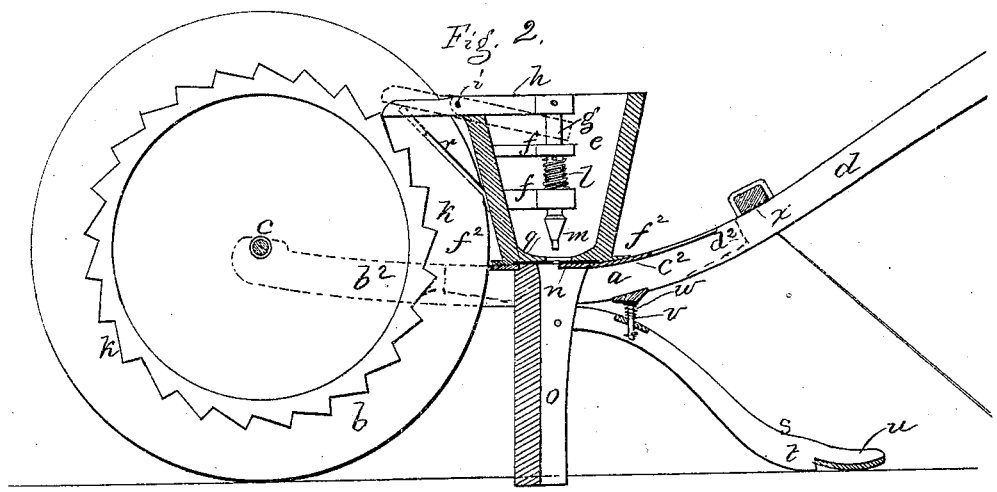
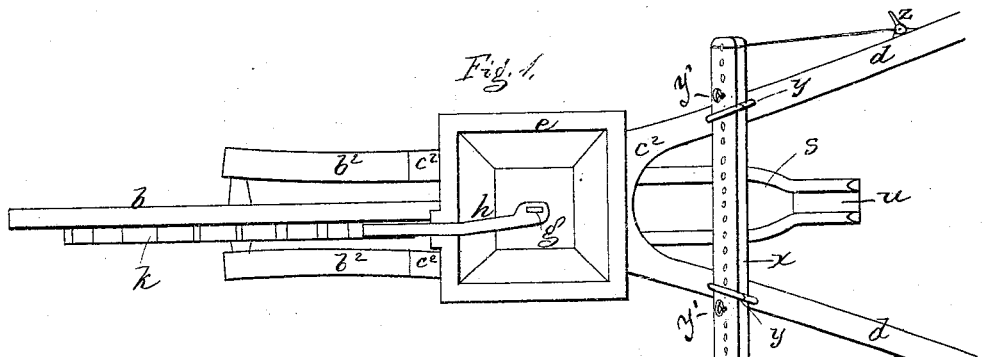
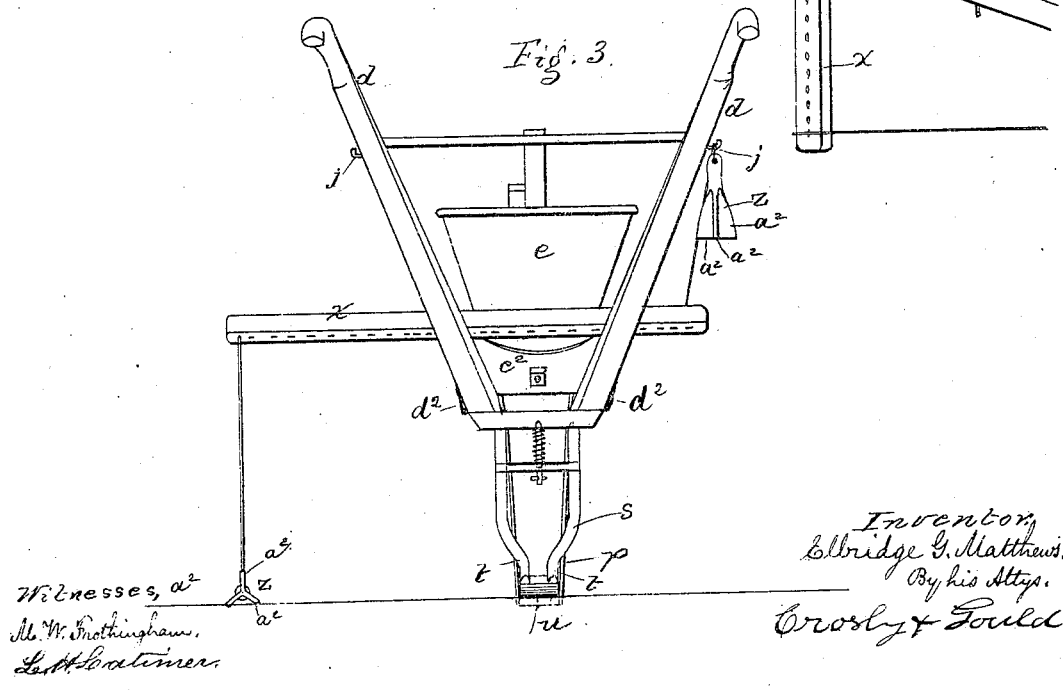
Witnesses,
M. W. Frothingham.
L. H. Latimer.
Inventor,
Elbridge G. Matthews.
By his Attys.
Crosby & Gould

UNITED STATES PATENT OFFICE.

ELBRIDGE G. MATTHEWS, OF OAKHAM, MASSACHUSETTS.

IMPROVEMENT IN SEED-DRILLS.

Specification forming part of Letters Patent No. 139,074, dated May 20, 1873; application filed February 21, 1873.

*To all whom it may concern:*

Be it known that I, ELBRIDGE G. MATTHEWS, of Oakham, in the county of Worcester and State of Massachusetts, have invented an Improved Seed-Drill; and I do hereby declare that the following, taken in connection with the drawing which accompanies and forms part of this specification, is a description of my invention sufficient to enable those skilled in the art to practice it.

In seed-drills it is customary to use disks or slides with graduated openings for different seeds or grains, and to shake the hopper, or to agitate the seeds in the hopper, to cause their delivery. But in none of such machines is the delivery uniformly effective, as seeds lodge in the delivery-orifice and choke it.

One, and, perhaps, the principal, object of my invention has reference to a construction by which I insure an effective and uniform delivery of seed, for which purpose I combine with the hopper a central plunger, mounted in suitable bearings, pressed upward by a suitable spring, and pushed down by the action of a lever operated intermittently by the teeth of a ratchet on the supporting-wheel of the machine, the bottom end of the plunger standing, normally, directly over the delivery-orifice of the gage-plate, and passing into the orifice as it moves down, thereby driving the seed through the orifice, and preventing the seed from clogging, and insuring a uniform delivery. The invention consists, primarily, in the combination with the hopper of this plunger thus mounted and operated.

The drawing represents a seed-drill embodying my improvements.

Figure 1 shows the drill in top view, the cap being removed. Fig. 2 is a sectional elevation of it. Fig. 3 is a rear elevation of it.

$a$ denotes the frame, having at its front end the supporting-wheel $b$, whose gudgeons turn in bearings $c$, and at its rear end the handles $d$. Between the wheel and the handles is the seed-hopper $e$, which is stationary with respect to the frame. In this hopper are two stationary bearings, $f$, in which is placed the plunger $g$, the plunger being in central position within the hopper, and being jointed at top to the inner end of a lever, $h$, which is fulcrumed at $i$, and has its outer end resting against ratchet-teeth $k$, at the side of the wheel $b$. A spring, $l$, forces the plunger up normally and presses the lever to the ratchet-teeth, while each tooth in succession raises the outer arm of the lever and thereby forces the plunger down. The bottom of the hopper inclines downward from each side to the center, and at the center is a large orifice, $m$, under which is some one of the delivery-orifices of the gage-plate $n$. Through the delivery-orifice $o$ the seed drops into a conductor or drill, $p$, at the foot of which the seed falls into the furrow made by the drill. The foot of the plunger is made straight, or of uniform size, and is slightly smaller than the orifice, and when the plunger descends its foot enters the orifice, and thereby positively expels the seed lodged in or over the orifice. To prevent injury to the plunger or to the edges of the orifice, its foot is preferably provided with a shoe, $q$, formed of rubber or a rubber compound, which will push the seed through, but will yield if it strikes the edge of the orifice. When the machine is moving toward or from the field reciprocation of the plunger may be arrested by raising the pawl-lever by a suitable prop, $r$. The seeds are buried by a peculiar coverer, $s$. This coverer is formed of two arms, pivoted to opposite sides of the conductor $p$, and fashioned into blades or shares $t$ at their lower ends, these blades drawing or inclining toward the center and ending in a shoe, $u$, which drags upon the ground, the blades $t$ drawing the earth or soil toward the furrow, and the shoe pressing it down into the furrow and upon the seeds. The extent of downward movement of the coverer is limited by a pin, $v$, a spring, $w$, pressing the coverer down, but enabling it to yield upwardly; and this pin and spring may be so arranged as to enable the extent of downward movement of the coverer, and the pressure to keep it down, to be regulated as may be desirable.

To mark the lines for the drills I use a single bar, $x$, from which to suspend the markers. This bar $x$ extends through staples $y$ on top of the handles $d$, and is provided with a series of holes, in which fit pins $y'$. A marker is connected to each or either end of the bar, and the bar is slid in either direction until the point from which the marker is hung is at the proper distance from the center of the machine, the bar being then fastened in position by placing the two pins in holes adjacent to the handles. Instead of using chains for markers, I use weights or drags $z$ of peculiar form. Each marker $z$ is fastened to the end of the bar $x$ by a suitable light line or chain, which will not drag upon the ground, and each is formed with three radiating blades $a^2$, two of which will lie upon the ground and drag straight over it, and mark a suitable line upon the surface, while, if the marker meets an obstruction, it will, if overturned at all, simply bring two blades upon the ground to drag as before, the movement of these markers being generally uniform, whereas with a chain the line made is generally very irregular or sinuous. When either marker is not in use it may be thrown up and suspended from a hook, $j$.

To impart the greatest strength to the main parts of the machine, and for the better construction of the conductor, I form the cast-metal conductor $p$ with a flange, $c^2$, extending laterally from its top, this flange and lips $d^2$ extending down from it, uniting, supporting, and strengthening the handles $d$ and wheel-arms $b^2$, and serving also as the support for the seed-box, flanges $f^2$ extending from the bottom of which box are directly fastened to the conductor-flange $c^2$. Said flange $c^2$ also serves to support the gage-plate $n$, which rests and turns directly upon the flange as a seat, or between it and the hopper, the orifice $o$ leading into an orifice opening through the flange $c^2$.

I claim—

1. In combination with the hopper, the plunger, having an automatic, positive, and intermittent downward movement to carry its foot into or toward the delivery-orifice, substantially as described.

2. In combination with the hopper and delivery-orifice, a plunger shod with rubber or rubber compound, substantially as described.

3. In combination with the hopper and conductor, the gage-disk $n$, placed upon the flange $c^2$, which forms an integral part of the conductor, and is fastened to the frame between the hopper and conductor, substantially as described.

4. In combination with the sewing-mechanism, the coverer formed with the converging blades $t$, having the shoe $u$, substantially as described.

5. The markers $z$, formed with the radiating blades $a^2$, substantially as described.

6. The conductor $p$, cast with the flange $c^2$, for sustaining the hopper and gage-plate, and uniting the handles $d$ and arms $b^2$, substantially as described.

ELBRIDGE G. MATTHEWS.

Witnesses:
G. L. RIPLEY,
H. S. HARWOOD.